Figure 1:
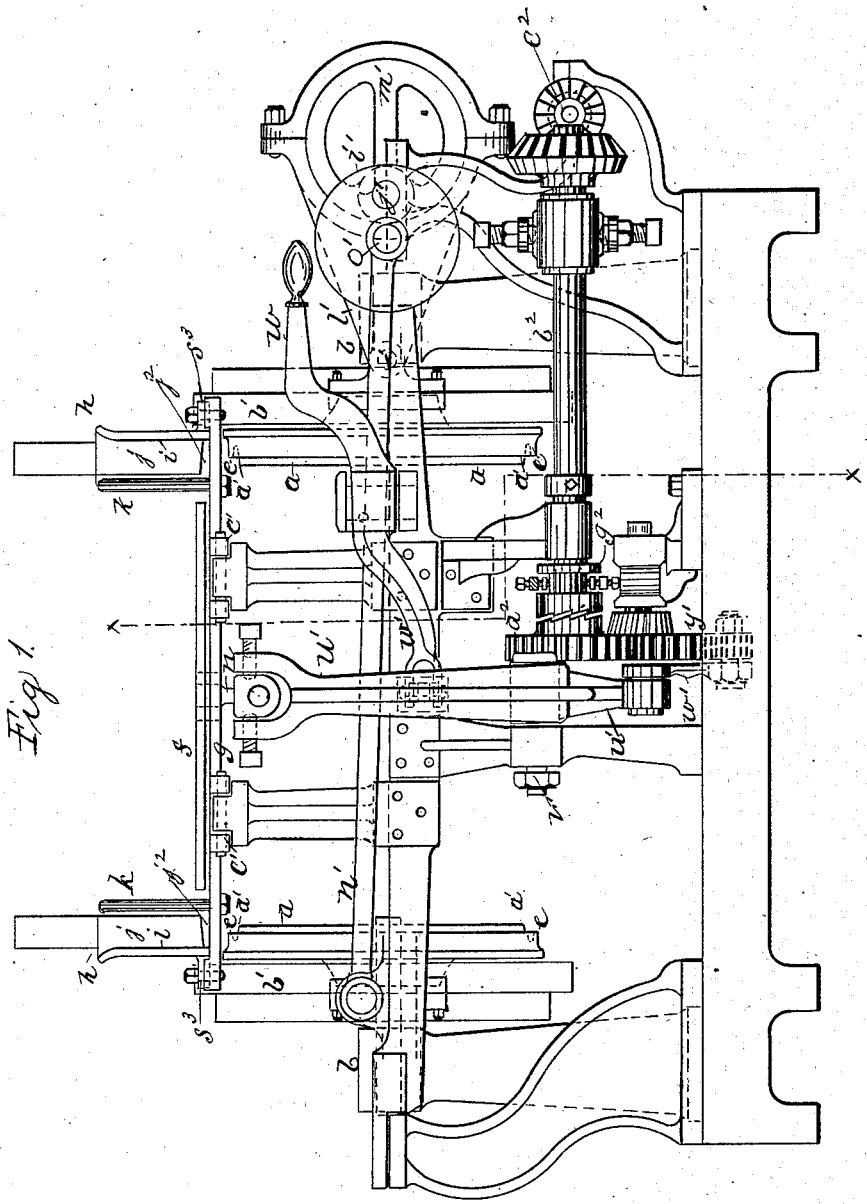

(No Model.) 6 Sheets—Sheet 1.

F. MYERS.
BARREL MAKING MACHINE.

No. 315,434. Patented Apr. 7, 1885.

Witnesses:
O. J. Morgan
S. H. Morgan

Inventor.
Fredk. Myers.
By A. P. Thayer,
Atty.

(No Model.)

F. MYERS.

BARREL MAKING MACHINE.

No. 315,434. Patented Apr. 7, 1885.

(No Model.) 6 Sheets—Sheet 3.

F. MYERS.
BARREL MAKING MACHINE.

No. 315,434. Patented Apr. 7, 1885.

Witnesses:
O. J. Morgan
S. H. Morgan

Inventor.
Fred. Myers,
By A. P. Thayer
Atty (No Model.) 6 Sheets—Sheet 6.

F. MYERS.
BARREL MAKING MACHINE.

No. 315,434. Patented Apr. 7, 1885.

UNITED STATES PATENT OFFICE.

FREDERICK MYERS, OF NEW YORK, N. Y.

BARREL-MAKING MACHINE.

SPECIFICATION forming part of Letters Patent No. 315,434, dated April 7, 1885.

Application filed November 14, 1883. (No model.) Patented in England December 31, 1883, No. 5,967.

*To all whom it may concern:*

Be it known that I, FREDERICK MYERS, a citizen of the United States, residing at New York city, in the county and State of New York, have invented new and useful Improvements in Barrel-Making Machines, (for which I have obtained a patent in Great Britain, No. 5,967, bearing date December 31, 1883,) of which the following is a specification.

In this improved barrel-forming machine the disks whereon the staves are arranged in the barrel-form to receive the truss-hoops do not turn around with the staves, as is generally the case in other machines, but are stationary, and have a groove into which the staves are pushed through a notch in the outer rim of the groove, and the staves are pushed around in the grooves to make the form. Prior to entering the grooves the staves are pushed over a bulging device that causes the required outward bend at the middle for the bulge of the barrel. From the bulger the staves pass over a ring located midway between the holding-disks that presses the staves outward and maintains them in the bulged shape, the ends of the staves being confined by the outer rims of the grooves in the disks. This ring is connected to a support which, when about two-thirds of the barrel-form is placed around the ring, is made to automatically release the ring. The ring is then retained by the staves already on and sprung between it and the flanges of the disks until the rest of the staves are pushed on and the barrel-form is completed. The truss-hoops are then forced on the barrel-form and the ends of the staves are sprung inward against or toward the inner walls of the grooves of the disks, thus enabling the barrel-form to be trussed tightly at the ends. One of the disks is then drawn back after the truss-hoop carriers retire to discharge the formed barrel, which takes the inside forming-ring with it. The ring is made collapsible, and is then collapsed by the attendant reaching into the barrel-form, and is returned to its place in the machine preparatory to another operation. In practice two or more rings will be used with one machine, so that one can be put in the machine as soon as the barrel-form containing another ring is discharged. These are the essential features of the machine; but it also comprises other devices of detail, as will be hereinafter fully described, reference being made to the accompanying drawings, in which—

Figure 2:
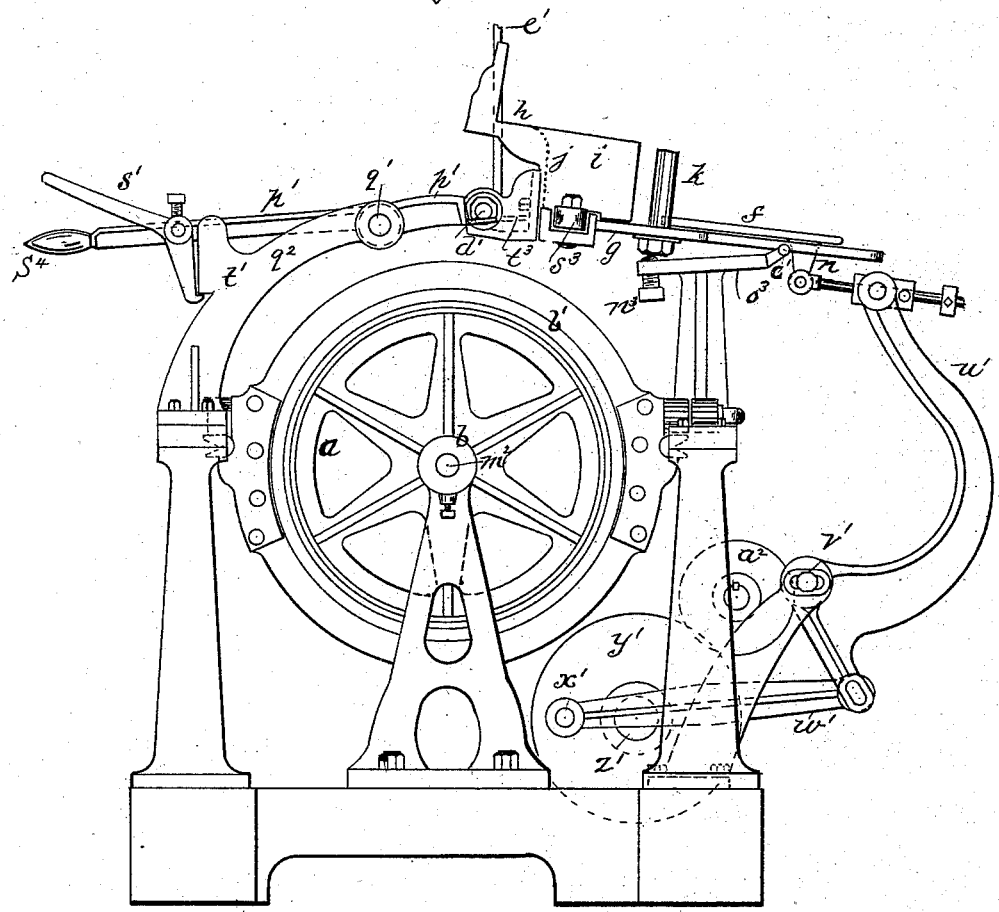
Figure 3:
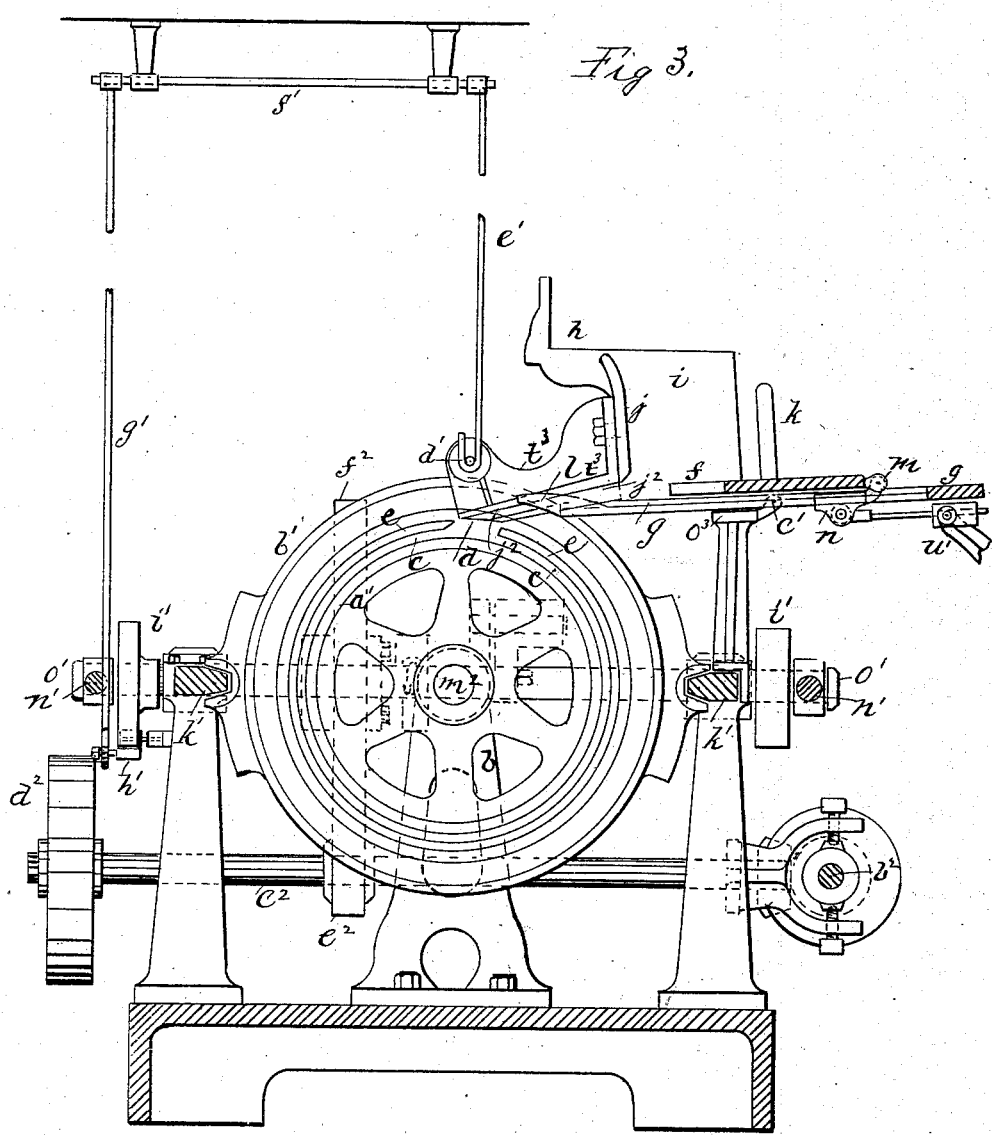
Figure 4:
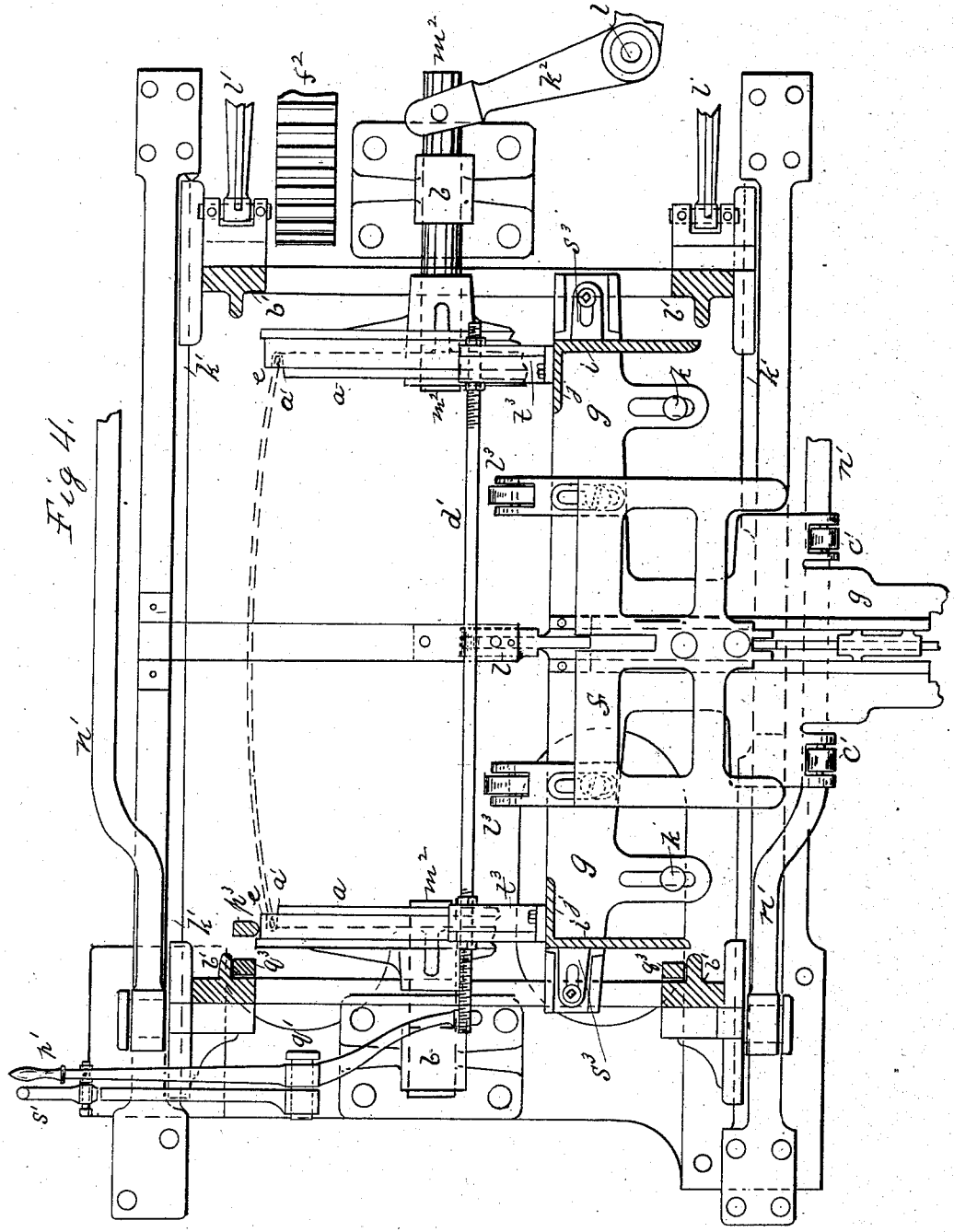
Figure 5:
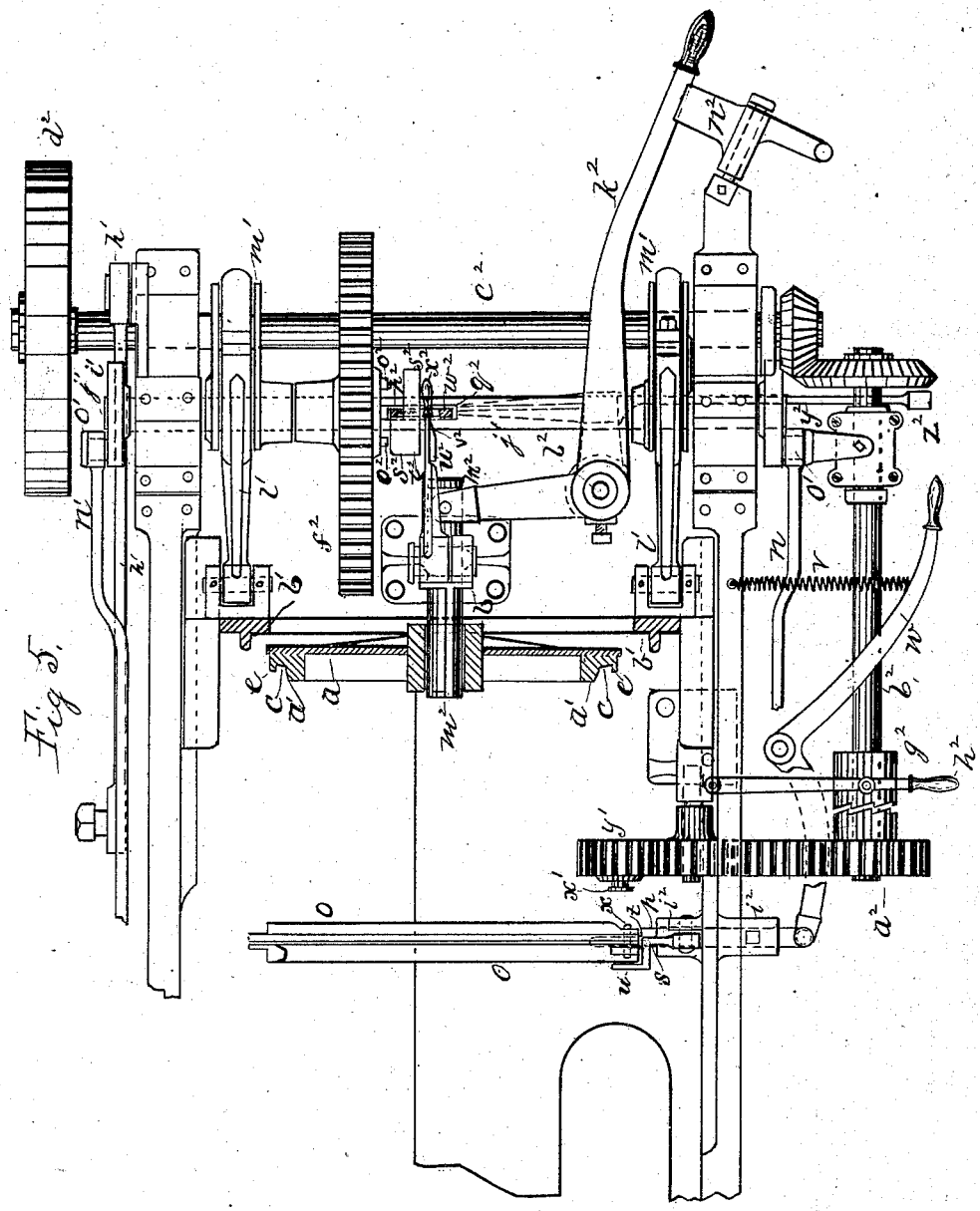
Figure 6:
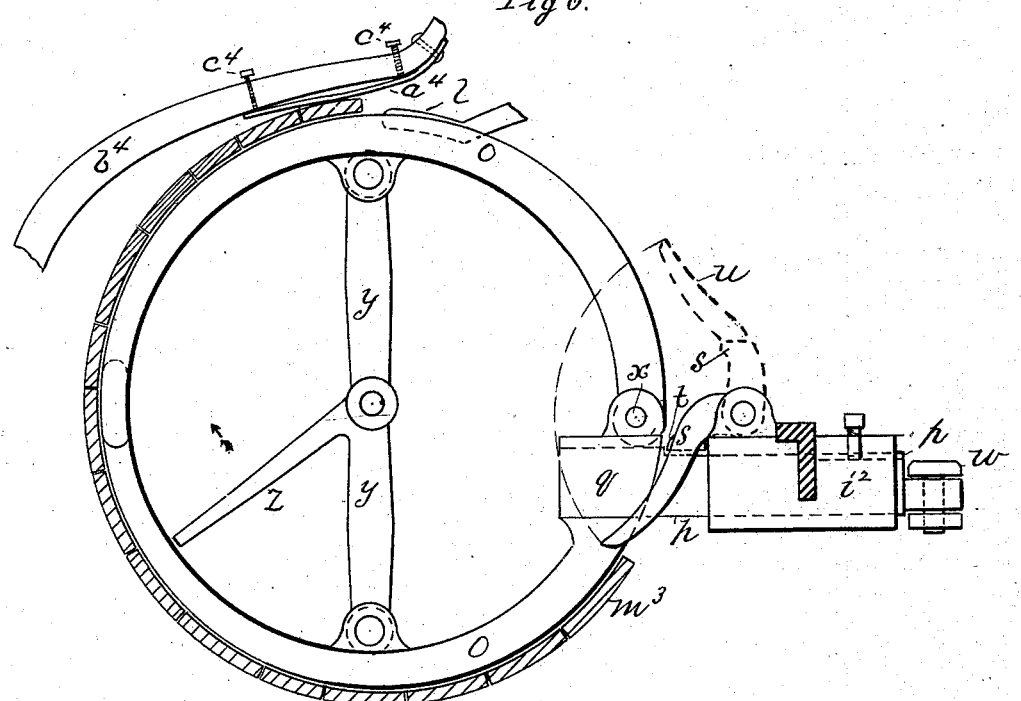
Figure 7:
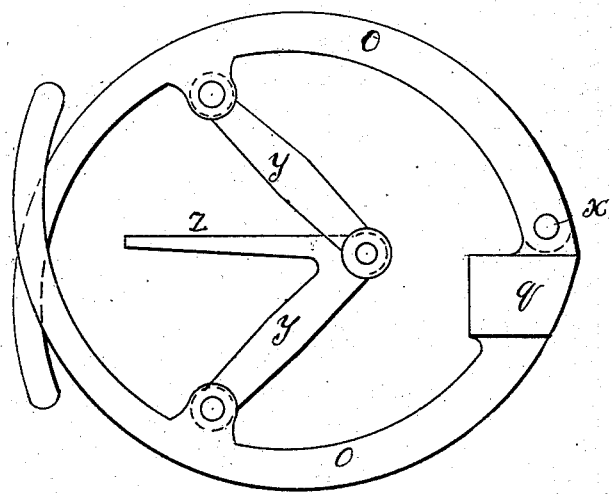

Figure 1 is a front side elevation of my improved barrel-forming machine. Fig. 2 is an end elevation looking at the left-hand side. Fig. 3 is a transverse sectional elevation on line $x\,x$ of Fig. 1, and looking toward the right hand. Fig. 4 is a plan view of the principal portion of the machine with some parts in horizontal section. Fig. 5 is also a plan view of a portion of the machine with some parts in horizontal section. Fig. 6 is a detail showing the bulging-ring in side elevation with part of a barrel-form on it in section, together with the apparatus by which the ring is mounted in the machine; and Fig. 7 is a side elevation of the bulging-ring as when collapsed for removal from the barrel-form.

The disks $a$, on which the staves are to be received and arranged in barrel form and held until the truss-hoops are applied, are, like other forming and retaining disks, arranged on axial supports $b$, a suitable distance apart to receive the staves between them by the ends of the staves. These disks, which have heretofore been arranged to turn on their axial supports as the staves are supplied to them, I now propose to arrange stationary, and construct them with a groove, $c$, in the face, with a notch, $d$, through the outer rim, $e$, of the groove, through which the staves enter, being pushed into the groove one after another, the staves in the groove being pushed around successively until the form is complete by the entering staves. The staves are to be pushed into these grooves of the forming-disks through grooved guides $j^2$ for the ends of the staves by a pusher, $f$, or feeder from the feeding-table $g$, whereon the staves are to be supplied in front of said pusher by any approved means. The means that I prefer and propose to employ consist of a bench, $h$, located over the feeding-table, and adapted to receive and hold the pile forming the complement of staves for one barrel, together with end guides, $i$, and edge guides, $j$, to guide the fall of the staves from the bench onto the table, the staves being dropped one by one from the pile by the attendant upon the table or the pusher, as they may happen to fall. In case they fall on the pusher the stationary stops $k$ will hold them when the pusher goes back, enabling the pusher to escape and let them fall on the table in front of the pusher. The length of the pusher is such that the staves will not fall behind the pusher when it goes forward.

The end guides, $i$, and edge guides, $j$, consist of angle-plates, which are adjustably bolted to the top of the table $g$ by slotted lugs $s^3$, Fig. 4; and the side plates, $t^3$, having the grooves $j^2$, through which the staves are pushed into the disks, are bolted to the edge guides, $j$, Figs. 2 and 3. The edge guides, $j$, terminate sufficiently above the table to allow the ends of the staves to pass under them into the grooves $j^2$. (See Figs. 1 and 3.)

At the edge of the table $g$, over which the staves are delivered to the forming-disks, and at the middle of the space between the disks, I arrange a bulger, $l$, also friction-rollers $l^3$, each side of the bulger. The bulger consists of a metal rib rising up from the plane of the table, and having a curved back over which the staves are to be forced for bulging them up in the middle, the ends being held down in the guide-groove $j^2$. The pusher is pivoted at $m$ to the slide $n$, which drives it and lies on the table $g$, so that it may rise up with the stave while the same is being bulged, and continue its bearing against the edge of the stave, and push it beyond the bulger into the disk. When the staves enter the grooves $c$ at their ends, they pass off from the bulger at their middle and onto a ring, $o$, located midway between the disks, and being to hold the staves out in the bulged form by pressing them at the ends against the outer rim, $e$, of the groove, thus keeping the staves in the bulged form without end pressure against the disks, enabling the staves to be pushed around easily in the grooves of the disks. This ring $o$ is supported on the end of a bar, $p$, which enters a socket in the ring at $q$, said bar being arranged to slide forward and backward in a suitable support, $i^2$, in the machine, and is secured in the holding position by a latch, $s$, pivoted to the fixed support $i^2$, and dropping behind a shoulder or ledge, $t$, of the bar $p$. The latch has an arm, $u$, projecting beyond the periphery of the ring and downward sufficiently below the bar to be touched by the edge of the first stave, $m^3$, of the barrel-form when the form has been pushed around about two-thirds of the course, and be raised by the stave, so that the latch will escape from the ledge $t$ of the bar $p$. A spring, $v$, attached to a lever, $w$, which is connected with the sliding bar $p$, will then instantly draw the supporting-bar of the ring back out of the ring and away from the course of the staves, the ring then being held solely by the staves, which then inclose about two-thirds of the circumference of the ring, and hold it sufficiently for the rest of the staves to be delivered on it, the ring then being carried by the staves and being inclosed by them, so that it retains them in the bulged form without other support. When the barrel-form is completed, the ring will be wholly inclosed in said form, and will remain there until the truss-hoops are put on and the form is discharged from the machine. The ring consists of two half-circular parts that are pivoted to the socket-head $q$ at $x$, and are held in position by jointed arms $y$ and the lever $z$, by which it is collapsed when the ring is to be removed from the trussed barrel-form after the latter has been discharged from the machine.

By the use of this bulge-ring and the outer rims, $e$, of the grooved disks for holding the staves, it will be seen that they may be held without end pressure of the disks on them, and also without any supporting rim or flange under or within the ends of the staves. I therefore make the inner rims, $a'$, of the grooves $c$ of the forming-disks considerably smaller than the inner circumference of the form of barrel-staves before the truss-hoops are put on, and may dispense with said rims altogether, in order that the staves may be contracted by the truss-hoops until the edges of the staves are firmly closed together, which cannot be well done when the staves are firmly lowered at the ends between the disks, nor at all when they are formed and rest on an inner flange; but it is desirable to have the ends of the staves touch the bottoms of the grooves in the disks when they enter said grooves, to keep the staves even with each other, and it is also desirable to have them continue to touch when the staves are contracted by the truss-hoops. I therefore form the bottom of the grooves in a bevel shape of about the angle or curve that the ends of the staves will describe when closed in by the truss-hoops. (See Fig. 5.)

The guides $j^2$ have to shift out of the way of the truss-hoop carriers $b'$ when the barrel-form is completed to allow said carriers to move forward and apply the truss-hoops $h^3$, Fig. 4; and it is also desirable that the guides be enabled to rise a little when the last stave is being pushed in and the first one has returned to the upper side under the guides, so that the stave will not be bound by the guides. The plates $t^3$, having the guide-grooves $j^2$, are therefore attached to the table, and the rear end of the table is pivoted to the supporting-frame at $c'$, enabling the guides to be raised by the staves any time it may be required. The guides and table are connected by rods $d'$ and $e'$ with the arm of a rock-shaft, $f'$, which is connected by another arm and a rod, $g'$, with a lever, $h'$, which is operated by a cam, $i'$, on the shaft $j'$, which operates the truss-hoop carriers $b'$, so that the guides and table will be raised automatically clear of said carriers just before they advance, and remain elevated until let down by the attendant, allowing the barrel-form to be freely discharged from the machine and truss-hoops placed on the disks. To hold the table up until this is accomplished, I employ a lever, $p'$, pivoted at $q'$ to a standard, $q^2$, with one end connected to the rod $d'$ of the table, and the other end, projecting from the machine at the back, having a handle, $s^4$. Near the handle is pivoted a catch-pawl, $s'$, which hooks into a notch, $t'$, of the standard when the table is raised to its extreme height either by the machine or by hand.

The truss-hoop carriers are mounted and slide in V-shaped ways $k'$, the one near the shaft being connected to eccentrics $m'$, which are rotated by shaft $j'$, and the other is connected to said shaft by the rods $n'$ and crank-pins $o'$, the crank-pins and the eccentrics being relatively arranged to move said truss-hoop carriers in opposite directions. When the truss-hoops are thus applied to the barrel-form, the latter is discharged from the machine by pulling the disk $a$ of the right-hand end of the machine back by a hand-lever, $k^2$, mounted on a fulcrum, $l^2$, and connected to the center shaft or stud, $m^2$, of the disk. The dog $n^2$ locks the lever $k^2$, holding the disk in the working position.

I arrange adjusting-screws $n^3$ under the feed-table $g$ and in the part $o^3$ of the frame to which the table is pivoted, by which to regulate the angle of the table with relation to the disks $a$; but they may be used or not, as preferred.

The pusher $f$ is connected to the rock-lever $u'$, having a fulcrum at $v'$, and connected by rod $w'$ with the crank-pin $x'$ of a wheel, $y'$, revolving on the center stud, $z'$, to which motion is imparted by the pinion $a^2$ on a shaft, $b^2$, which gears with the driving-shaft $c^2$, on which the driving-pulley $d^2$ is fitted, to apply the power to the machine, and which drives the truss-hoop carrier-shaft $j'$ by the pinion $e^2$ and wheel $f^2$. (See Fig. 3.)

The shaft $b^2$ has continuous motion, and the pinion $a^2$ is connected to said shaft by a clutch, $g^2$, having a hand-lever, $h^2$, for enabling the operator to start and stop the pusher, as required.

The pusher is to be stopped when a barrel-form is completed, although it may run without harm when the table is held up by bar $p'$, and there are no staves supplied to the pusher, and it is to be started again ready for making another form.

The truss-hoop driving-shaft $j'$ is to make only one revolution at each operation. The driving-wheel $f^2$ by which it is turned is therefore fitted loosely on said shaft to turn continuously, and is provided with a number of clutch-studs, $o^2$, projecting from one side of its hub to be engaged by the gib $p^2$ when the carriers are to be set in motion. The gib slides in a groove, $q^2$, of the shaft and a collar, $s^2$, thereon, and is shifted forward into connection with the studs by the spring $t^2$ for starting the truss-hoop carriers. The gib is withdrawn to stop the carriers and held in check to let the carriers rest by the trip-lever $u^2$, which has an incline, $v^2$, that the head $w^2$ of the gib runs against, when the trip-lever is let fall for the purpose, and draws the gib back free of the clutch-studs $o^2$.

To start the truss-hoop carriers, the trip-lever $u^2$ is to be lifted above head $w^2$. To allow the spring to act, it may be lifted by the handle $x^2$; but for enabling the attendant to raise it from his position in front of the machine the foot-lever $y^2$ is arranged with said trip-lever and extended to the front of the machine, as shown, to be worked by the foot of the operator at $z^2$.

I propose to use rubber or other elastic cushioning-rings $q^3$, Fig. 4, in the truss-hoop carriers, behind the truss-hoops, for yielding to the resistance of the truss-hoops when necessary; and to prevent any of the staves from springing up too high by the bulger and the bulging-ring, and prevent the edges of wide staves from overlapping the edges of narrow ones, as they naturally will in consequence of their tangential extensions from the point of contact on the bulging-hoop, I will have a spring-presser, $a^4$, located in suitable relations with said bulger and ring, about as represented in Figs. 4 and 6, to press down any such projecting edges. The spring may be supported on a strong curved bar, $b^4$, attached to the frame and suitably extending up over the bulger and ring. The spring may be provided with adjusting-screws $c^4$ to regulate its tension.

It has been found in practice that staves which have been chined and crozed beforehand will not bear the necessary end pressure to be held in the bulged condition by the friction of the pressure of plain retaining-disks on the ends, nor by points of said disks projecting into the ends of the staves, especially in the case of strong rigid staves for heavy barrels, but that the ends will crush and split and be materially damaged by such pressure, and at the best the bulge of some staves will be higher than others and the staves are liable to slip out of place without more positive means of holding them.

It will therefore be seen that the contrivance of stationary grooved disks having a notch in the outer rim to receive the staves into the grooves to be pushed around therein, together with the bulge-retaining ring, affords a simple and efficient means of holding the previously-bulged staves without any pressure on the ends and in such positive manner that none can escape, though some may be much shorter or more liable to crush than others.

The contrivance of mechanism connecting the truss-hoop carriers with the driving-shaft for operating said truss-carriers; also the contrivance of elastic rubber rings with the retaining-disks and truss-hoop carriers; and, also, the contrivance of the feed-table and feed-bar to be raised out of the way of the truss-hoop carriers, and mechanism for raising the same when said truss-hoop carriers move forward to apply the truss-hoops, all being the same as represented in a prior application filed by me May 2, 1883, No. 93,686, and forming the subject-matter of the second, third, fourth, and fifth claims of said application, are hereby disclaimed in this case.

Having thus described my invention, what I claim, and desire to secure by Letters Patent, is—

1. The combination, in a barrel-forming machine, of stationary receiving and retaining disks having a circular groove to receive the staves, the bulge-supporting ring, and means for pushing the staves into and around in the grooves to make the barrel-forms, the outer rim of the groove being notched for the entry of the staves into the grooves, substantially as described.

2. The combination, in a barrel-forming machine, of stationary receiving and retaining disks having a circular groove to receive the staves through a notch in the outer rim of the groove, the bulge-supporting ring, and guides for guiding the staves to the notches opening to said grooves, substantially as described.

3. The combination, in a barrel-forming machine, of stationary receiving and retaining disks having a circular groove to receive the staves through a notch in the outer rim of the groove, the bulge-supporting ring, guides for guiding the staves to the notches opening into said grooves, and a pusher to push the staves through the guides into the grooves and also around in said grooves to make the barrel-form, substantially as described.

4. The combination, in a barrel-forming machine, of stationary receiving and retaining disks having circular grooves to receive the staves through notches in the outer rims of said grooves, the bulge-supporting ring, guides for guiding the staves into said grooves, a pusher to push the staves into the grooves, and a bulger to bulge the staves while being pushed into the grooves, substantially as described.

5. The combination of the stationary grooved receiving and retaining disks having a notch in the outer rim of the groove through which the staves are pushed into the grooves, the bulger by which the staves are bulged prior to entering said grooves, and the bulge-retaining ring which maintains the bulge of the staves while being trussed by pressing said staves against the outer rims of the grooves of the disks, substantially as described.

6. The combination, in a barrel-forming machine, of the grooved stationary receiving and retaining disks and the bulge-supporting ring, said ring being detachable from its support when partly inclosed by the staves, and thereafter being carried and supported by the staves during the completion of the barrel-form, substantially as described.

7. The combination, in a barrel-forming machine, of the grooved stationary receiving and retaining disks, a bulge-supporting ring, and means, substantially as described, for automatically detaching the ring from its support by the first and advancing stave of the partial barrel-form, substantially as and for the purpose specified.

8. The combination, in a barrel-forming machine, of stationary grooved receiving and retaining disks and a detachably-supported and collapsible bulge-supporting ring, substantially as described.

9. The combination, in a barrel-forming machine, of grooved stationary receiving and retaining disks, a bulge-supporting ring, and truss-hoop carriers, substantially as described.

10. In a barrel-forming machine having a pair of stationary grooved receiving and retaining disks, a central bulge-supporting ring and truss-hoop carriers for simultaneously trussing both ends of the barrel-form, the grooves of the disks having a bevel or inclined bottom corresponding to the curves described by the stave ends when closed by the truss-hoops over the bulge-supporting ring, substantially as described.

11. The combination, with the stationary grooved retaining-disks, of the bulge-supporting ring having a socket-head, $q$, fitted to the end of a sliding bar, $p$, said bar having means for withdrawing it and releasing the ring, substantially as described.

12. The combination, with the stationary grooved retaining-disks, of the bulge-supporting ring having a socket-head, $q$, fitted to the end of sliding bar $p$, having a lever, $w$, and spring $v$, to withdraw said bar to detach the ring, said bar also having a retaining-ledge, $t$, and being provided with a holding-catch, $s$, substantially as described.

13. The combination, with the stationary grooved retaining-disks, of the bulge-supporting ring $o$, ring-supporting bar $p$, latch $s$, retracting-lever $w$, and spring $v$, said latch having an arm, $u$, arranged to be raised by the partly-completed barrel-form to automatically trip the latch for detaching the ring from its support, substantially as described.

14. The combination of the pivoted and vertically-shifting table $g$, stave-guides $j^2$, attached to said table, and reciprocating pusher $f$ on said table, with the stationary grooved receiving and retaining disks and truss-hoop carriers, said table, guides, and pusher being arranged to deliver the staves into the grooves of the retaining-disks, and said table having lifting mechanism to raise it out of the range of the truss-hoop carriers, substantially as described.

15. The combination of the pivoted and vertically-shifting table $g$, stave-guides $j^2$, bulger $l$, and the pusher $f$, reciprocating on said table, with the truss-hoop carriers, and stationary grooved receiving and retaining disks $a$, said table, guide, bulger, and pusher being arranged to bulge the staves and deliver them into the grooves of the retaining-disks, and said table having lifting mechanism to raise it out of the range of the truss-hoop carriers, substantially as described.

16. The combination of the pivoted and vertically-shifting table $g$, stave-guide $j^2$, bulger $l$, and the pusher $f$, arranged on said table, with the stationary grooved receiving and retaining disks $a$ and the bulge-supporting ring $o$, said table, stave-guides, bulger, and pusher being arranged to bulge the staves and deliver them into the grooves of the retaining-disks and onto the bulge-supporting ring and adapted to be raised out of the range of the truss-hoop carriers, substantially as described.

17. The bench $h$, located above the feeding-table and pusher, guides $i$ and $j$, adapted to control the staves in falling from the pile or bench onto the feeding-table, and the stops $k$, arranged to prevent the staves that may fall on the pusher from being carried backward thereon, in combination with the feeding and reciprocating pusher, substantially as described.

18. The combination, with the stationary grooved retaining-disks adapted to receive the barrel-form, bulger $l$, located midway between the disks, and adapted to bulge the staves previous to entering the disks, the bulge-retaining ring located in the plane of the bulger, and the presser $a^4$, said presser being arranged to bear on and confine the staves to the bulger and the bulge-retaining ring, substantially as described.

In witness whereof I have hereunto signed my name in the presence of two subscribing witnesses.

FREDERICK MYERS.

Witnesses:
W. J. MORGAN,
A. P. THAYER.